United States Patent [19]
Straub

[11] Patent Number: 4,848,780
[45] Date of Patent: Jul. 18, 1989

[54] CARRIAGE ASSEMBLY FOR A JOGGER

[76] Inventor: Paul M. Straub, 23326 Hawthorne Blvd., Torrance, Calif. 90505

[21] Appl. No.: 152,956

[22] Filed: Feb. 5, 1988

[51] Int. Cl.⁴ .............................................. B62B 5/00
[52] U.S. Cl. .................................. 280/1.5; 280/47.25
[58] Field of Search ...................... 280/1.5, 47.25, 63

[56] References Cited
U.S. PATENT DOCUMENTS 3,829,113  8/1974  Epelbaum ...................... 280/47.25
4,236,723  12/1980  Lemmon .............................. 280/1.5
4,570,956  2/1986  Dyer ............................ 280/47.25 X

FOREIGN PATENT DOCUMENTS 412119  4/1910  France ................................ 280/1.5

Primary Examiner—John A. Pekar

[57] ABSTRACT

An assembly generally in the form of a carriage specifically designed to movably support a child or infant occupant when maintained in a conventional protective and restraining chair wherein the chair is mounted on the suppport platform and the support platform is affixed to a wheel and axle assembly. A drafting structure extends outwardly from the support platform and is dimensioned and configured for connection to a person who propels the carriage by walking or jogging. The person can therefore perform the desired exercise program, such as jogging while an infant occupant can ride on the support platform of the carriage and thereby accompany the jogger.

10 Claims, 1 Drawing Sheet

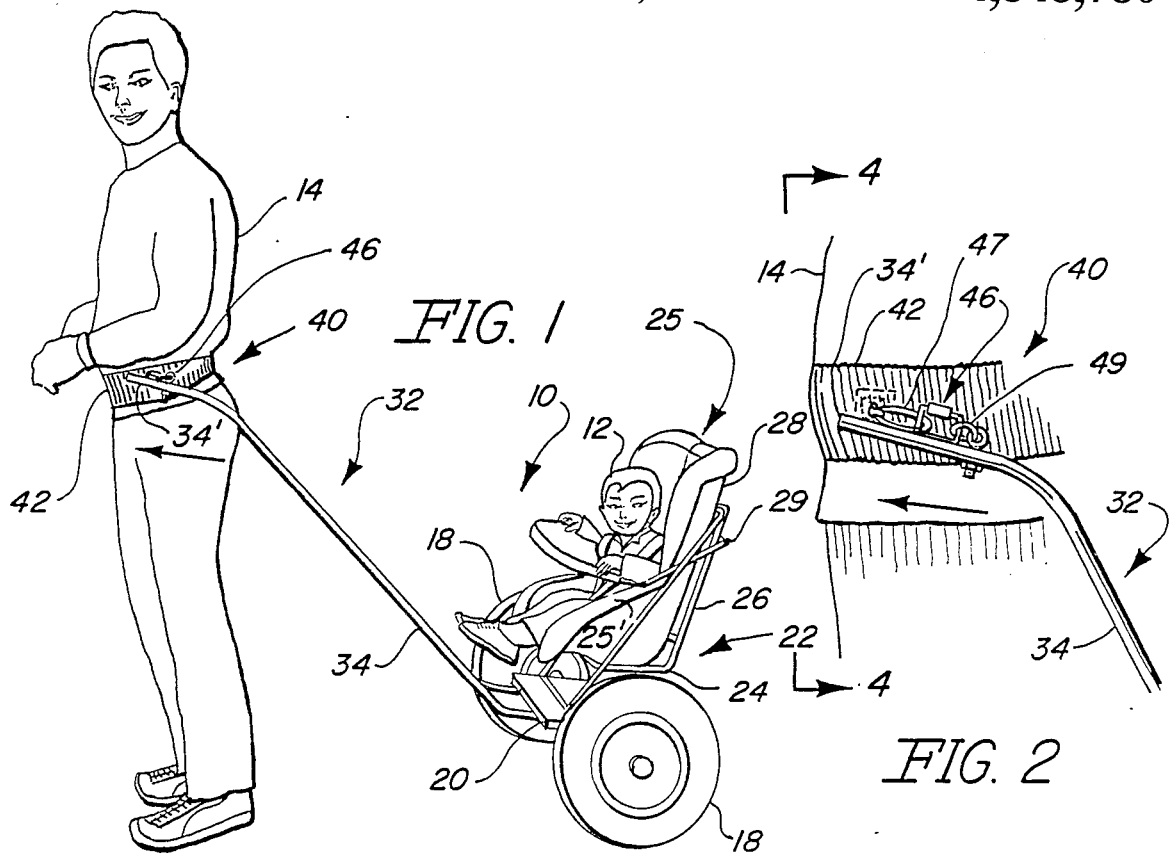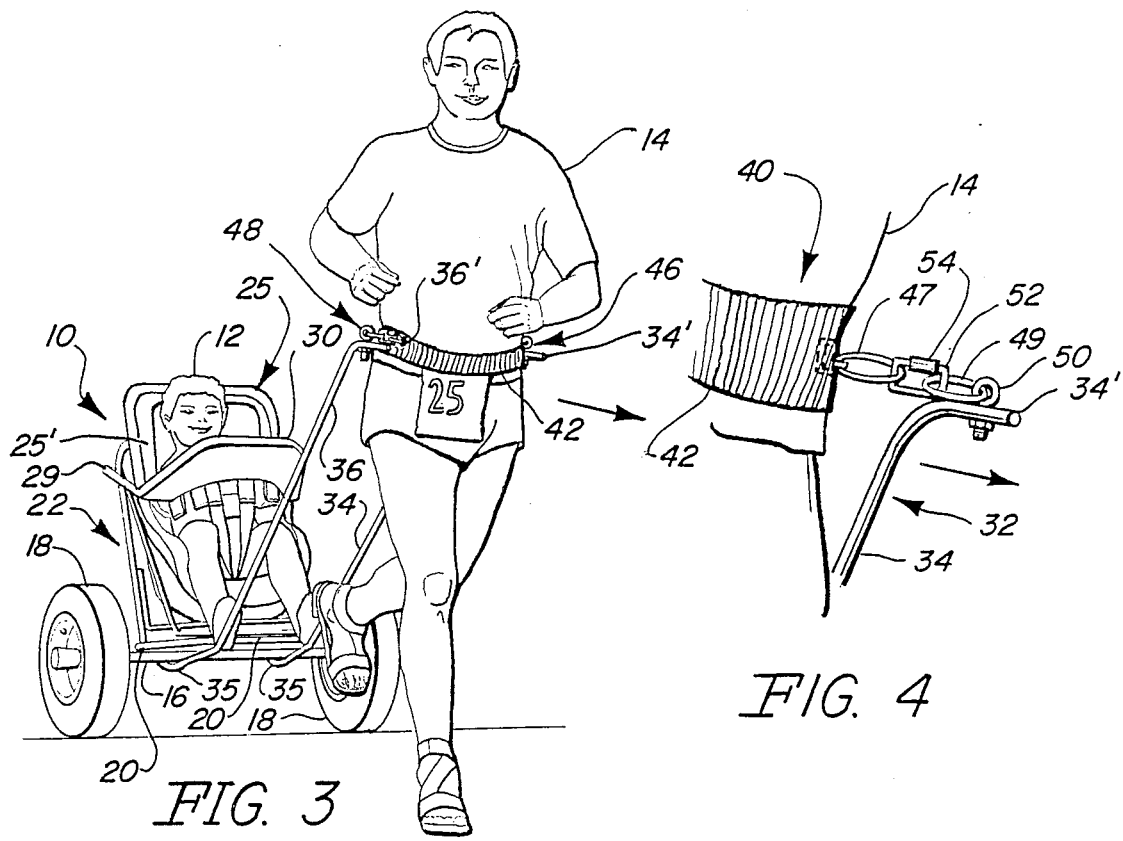

4,848,780

CARRIAGE ASSEMBLY FOR A JOGGER

BACKGROUND OF THE INVENTION

1. Field of the Invention

This invention relates to a carriage assembly designed to be propelled or powered by a person who is jogging or walking and further wherein the remainder of the carriage assembly is adapted to removably retain an infant or child occupant thereon in a conventionally structured and designed safety seat.

2. Description of the Prior Art

In recent years the general population has become more health conscious resulting in many more people conducting a substantially rigorous exercise program. One of the more popular forms of exercise is jogging wherein a person may jog or run many miles per day. Alternately, rapid walking has also increased in popularity wherein both jogging and walking are designed to increase the cardio-vascular system and the overall health and fitness of the one exercising.

One problem associated with either jogging or walking is the time involved as well as the fact that an adult jogger generally runs at a pace which is faster than most children or certainly any infant. This in turn makes it impractical for an adult to be accompanied by a small child and certainly impossible for an infant to accompany a parent.

Due to the relatively far distances that a person normally jogs or walks, carrying of an infant also would be highly impractical because of the fatigue factor. Any type of harness adapted to mount or secure an infant to the body of the jogger would not only involve additional weight and attendant fatigue to the jogger but also most likely be very uncomfortable to the infant.

Therefore, there is a recognized need in the exercise area particularly involving jogging or long distance walking for a facility or structure which would allow the accompanyment of an infant or small child with a parent jogger during the entire route traveled. Such a facility, however, should be structured and designed so as not to unduly fatigue the jogger and allow him complete freedom of movement so as to jog or walk at a normally established pace while maintaining the desired form. In addition, such a facility should insure both the comfort and safety of the infant during such exercise period considering that the infant will be traveling at a relatively fast pace.

SUMMARY OF THE INVENTION

The present invention is directed to a carriage assembly specifically designed to support a small child or infant on a support platform of the carriage assembly wherein a drafting structure or assembly associated with the carriage assembly is adapted to be attached generally to a person and further wherein the person is allowed to walk, jog, run, etc. in a normal fashion. The carriage assembly, more specifically, is effectively pulled by the exercising jogger thereby enabling the infant or small child to accompany the jogger without unduly burdening the jogger with the excess weight of carrying the child in his arms or by means of an adaptable harness attached directly to the jogger.

The carriage assembly of the present invention comprises a support frame including two spaced-apart wheels of the type which may take a variety of commercially available designs and constructions. A fixed support platform is attached between the wheels and is adapted to have a mounting means secured thereto. The mounting means itself is also fixedly secured to the platform and of course travels with the carriage during its movement. In order to adequately protect and retain an infant or small child, the mounting means is dimensioned and configured to removably support a protective retaining chair generally of the type referred to as "car seat" and used in automobiles to restrain and protect the child during travel therein. Further, the mounting means should be specifically structured to be sufficiently variable for support of such types of retaining chairs having a variety of different structural sizes and design configurations.

Connecting means may be considered part of the mounting means and is attached thereto for retaining engagement with appropriately positioned portions of the safety chair in which the infant travels.

An important feature of the present invention is the existence of a drafting means or assembly connected at one proximal end thereof to the support platform and extending outwardly therefrom. The distal or opposite end of the drafting assembly can be attached to the body of a person in a manner which will enable the person to propel the support platform and infant occupant by pulling when the drafting person begins to walk, jog, run, etc. In this manner, an adult jogger may be accompanied by a small child or infant without placing undue weight or stress on his body thereby allowing him to maintain his normal pace of walking, jogging, running, etc. as well as the style and normal freedom of movement. To accomplish the latter, an attachment means is provided in the form of a belt or other waist engaging portion secured to or surrounding generally the waist area of the exerciser. The free end of the drafting facility or structure located distant from the support frame of the carriage assembly is dimensioned to be attached to opposite sides of the waist of the jogger generally in the area of both hips. In addition, the attachment means further comprises two linkage assemblies which interconnect the free end of the draftng structure to the waist engaging portion in a manner which facilitates the free and easy movement of the pulling person whether such person decides to walk, jog, run, etc.

Additional details of the various components and structure of the pressure invention will be described in greater hereinafter.

BRIEF DESCRIPTION OF THE DRAWINGS

FIG. 1 is a perspective view of the carriage assembly of the present invention mounted on a standing person in the operative manner.

FIG. 2 is a detail view and partial cut-away showing portions of a linkage assembly used to interconnect the carriage assembly to the person.

FIG. 3 is a perspective view of a person pulling the subject carriage assembly when in a jogging or running mode.

FIG. 4 is a detail view in perspective and partial cut-away showing structural details of the linkage assembly used to interconnect the draft structure to the pulling person.

DETAILED DESCRIPTION OF THE PREFERRED EMBODIMENT

As shown primarily in FIGS. 1 and 3, the present invention relates to a carriage assembly generally indicated as 10 of the type designed to carry an infant or small child occupant 12 while the carriage assembly 10 is propelled by a walking, jogging or running person 14. More specifically, the carriage assembly 10 comprises a frame 16 having two rotatable wheels 18 mounted on opposite sides thereof. The wheels may be of a variety of conventional and commercially available types and should be specifically designed to travel over a variety of terrains; keeping in mind that safety and comfort must be important factors in the support, retention and carrying of the infant occupant 12.

The carriage assembly 10 further comprises a support platform 20 fixedly secured on the frame 16 between the wheels 18 and generally in overlying relation to the axle or elongated portion of the frame 16, as best shown in FIG. 3. A mounting means is generally indicated as 22 and is fixedly supported to the platform 20 in an upstanding orientation.

The mounting means includes a first portion 24 designed to fit beneath and engage the under surface of the seat portion 27 of the chair 25 which supports and retains the child occupant 12 therein. In addition, the mounting means includes a second portion as at 26 for engaging the outer surface of the backrest as at 28 of the chair 25. In this manner, the chair 25 is disposed in its intended upright orientation for retention and support of the child 12 therein. The chair 25 may take a variety of prior art and commercially available design configurations and is generally of the type referred to as a "car seat" which safely retains and supports an infant or child 12 on the interior of an automobile. The mounting means 22 further may include connecting means in the form of outwardly extending depending arms or straps 29 secured to and engaging the side portions as at 25' of the retaining chair 25 as shown both in FIGS. 1 and 3. In accordance with the normal structural designs of such chairs 25 a support and retaining member as at 30 may also be considered a part of the chair 25 for the safe retention of the child therein.

An important feature of the present invention is the provision of a draft means or assembly generally indicated as 32 and including two spaced apart arms 34 and 36. The draft means 32 has one proximal end secured preferably to the under portion of the support platform 20 as at 35. Fixed securement thereto of the proximal end 35 may take a variety of structural configurations but should be sufficiently secure and rigid to facilitate pulling of the support platform 20 and frame 16 easily by the forward motion of the pulling person 14. Each of the arms 34 and 36 has a distal free end 34' and 36' respectively disposed to attach to the person 14 as clearly shown in FIGS. 1 through 4. More specifically, the arms have an outwardly and substantially upwardly angular orientation as they protrude from the frontal portion of the support platform 20. This configuration places the free ends 34' and 36' generally adjacent each of the oppositely disposed hips of the runner 14 in the waist area.

An attachment means is generally indicated as 40 and includes a belt or like waist engaging portion 42 secured to the person 14 in a manner which is attached to or at least partially surrounds the waist area as clearly shown.

The attachment means of the present invention further comprises attachment structures in the form of two linkage assemblies generally indicated as 46 and 48. The structure of the linkage assemblies are shown in detail in FIGS. 2 and 4 with regard to the one linkage assembly 46. Suffice it to say that a description of the one linkage assembly 46 is an adequate description of both, since both are correspondingly structured. The linkage assembly 46 includes a first attachment link 47 secured to the waist engaging portion 42. Such first attachment link 47 may be in the form of a ring permanently secured to the waist engaging portion or belt 42 and generally extending outwardly therefrom. A second link 49 is connected to each of the free ends such as free end 34' in FIGS. 3 and 4. An appropriate connector structure which may take a variety of different design configurations is fixedly or permanently mounted as at 50 on the respective free ends as at 34' so as to allow movable positioning of the second link 49 relative to the respective free ends as at 34'. An interconnecting link 52 is provided between and in movable interconnection with both the first and second links 47 and 49. By virtue of the fact that the links 47 and 49 and 52 are all movable relative to one another a free and easy effective motion is allowed between the respective free ends 34' and 36' and the waist engaging portion 42 and accordingly relative to the person 14 regardless of whether the person is maintained in an upright standing position as in FIG. 1 or a walking, jogging or running position as shown in FIG. 3.

Further, a closure structure as at 54 may be considered a part of the interconnecting link 52 so as to allow an opening of the ring-like configuration of the link 52 in order to readily detach the free ends 34' and 36' from the waist engaging portion 42 by disengaging or disconnecting the first and second links 47 and 49 respectively.

Now that the invention has been described, what is claimed is:

1. A carriage assembly designed to support and carry a child occupant and structured for being pulled by person while either walking or jogging, said assembly comprising:
   a. a carriage frame including an axle having an elongated configuration and two wheel structures rotatably connected to opposite ends of said axle in movably supporting relation thereto,
   b. a support platform supported on said axle between said wheel and mounted to travel therewith,
   c. a mounting means fixedly secured to said support platform and extending outwardly therefrom for receiving engagement with a chair for the child occupant,
   d. said mounting means including connecting means for removable attachment to the chair in an upright, operable position for support and retention of the child occupant therein,
   e. a drafting means attached to said support platform and extending outwardly from a leading portion thereof for attachment to the pulling person,
   f. said drafting means including two elongated arms spaced apart from one another a distance sufficient for attachment to opposite sides of the pulling person,
   g. attachment means secured to said pulling person and structured for movable interconnection of both free ends of said arms to the pulling person and comprising a waist engaging portion removably secured to the pulling person and two attachment structures each secured to said waist engaging portion at an opposite side of the pulling person and movably attaching a correspondingly disposed free end of a different one of said arms to said waist engaging portion,
   h. each of said attachment structures comprising a linkage assembly including an attachment link movably attached in interconnecting relation between said waist engaging portion at one side of said pulling person and said one free end of said arm, and i. each of said linkage assemblies further including a first link secured to said waist engaging portion at one oppositely disposed side thereof and a second link secured to said one correspondingly positioned free end of one of said arms; said interconnecting link movably interconnected between and to each of said first and second links.

2. An assembly as in claim 1 wherein said two arms extend outwardly and angularly upward from said support platform and being of substantially equal length, said free ends normally connectable to opposite sides of the pulling persons.

3. An assembly as in claim 2 wherein said two arms are of sufficient length to allow the pulling person to assume a jogging mode.

4. An assembly as in claim 3 wherein said one end of said drafting means is fixedly secured to an under portion of said support platform and configured to extend outwardly and angularly upward to a substantially waist height disposition of the free ends of said arms relative to the pulling person.

5. An assembly as in claim 1 wherein each of said linkage assemblies are disposed and structured for movable attachment of both said free ends to said waist engaging portion during jogging travel of the pulling person.

6. An assembly as in claim 1 wherein said mounting means is configured to supportingly engage outer and under surface portions of the occupant's chair.

7. An assembly as in claim 6 wherein said mounting means comprises a first support member disposed and configured for retaining support of an under surface of the seat of the chair.

8. An assembly as in claim 7 wherein said mounting means further comprises a second support member disposed and configured for retaining support of an outer surface of a back rest of the chair.

9. An assembly as in claim 8 wherein said first and said second support members are connected in fixed, substantially perpendicular relation to one another.

10. An assembly as in claim 9 wherein said connecting means comprises two connecting legs secured at one end to said second support member and extending outwardly therefrom into removable and retaining engagement with the occupant's chair.

* * * * *